(12) United States Patent
Li et al.

(10) Patent No.: US 10,896,535 B2
(45) Date of Patent: Jan. 19, 2021

(54) REAL-TIME AVATARS USING DYNAMIC TEXTURES

(71) Applicant: Pinscreen, Inc., Westlake Village, CA (US)

(72) Inventors: Hao Li, Los Angeles, CA (US); Koki Nagano, Los Angeles, CA (US); Jaewoo Seo, Los Angeles, CA (US); Lingyu Wei, Los Angeles, CA (US); Jens Fursund, Copenhagen (DK)

(73) Assignee: Pinscreen, Inc., Westlake Village (GA)

( * ) Notice: Subject to any disclaimer, the term of this patent is extended or adjusted under 35 U.S.C. 154(b) by 0 days.

(21) Appl. No.: 16/430,204

(22) Filed: Jun. 3, 2019

(65) Prior Publication Data

US 2020/0051303 A1    Feb. 13, 2020

Related U.S. Application Data

(60) Provisional application No. 62/718,285, filed on Aug. 13, 2018.

(51) Int. Cl.
*G06T 13/40* (2011.01)
*G06T 15/04* (2011.01)
*G06T 17/20* (2006.01)

(52) U.S. Cl.
CPC .......... *G06T 13/40* (2013.01); *G06T 15/04* (2013.01); *G06T 17/20* (2013.01); *G06T 2210/44* (2013.01)

(58) Field of Classification Search
CPC ........ G06T 13/40; G06T 15/04; G06T 17/20; G06T 2210/44; G06N 20/20; G06N 3/0454; G06N 3/08
See application file for complete search history.

(56) References Cited

U.S. PATENT DOCUMENTS 10,504,268 B1 * 12/2019 Huang ............... G06K 9/00302
2004/0095344 A1 * 5/2004 Dojyun ................. G06N 3/004
                                                              345/419
(Continued)

OTHER PUBLICATIONS

Thomas, Diego, and Rin-Ichiro Taniguchi. "Augmented blendshapes for real-time simultaneous 3d head modeling and facial motion capture." Proceedings of the IEEE Conference on Computer Vision and Pattern Recognition. 2016. (Year: 2016).*

(Continued)

*Primary Examiner* — Daniel F Hajnik
(74) *Attorney, Agent, or Firm* — SoCal IP Law Group LLP; Jonathan Pearce

(57) ABSTRACT

A system and method for generating real-time facial animation is disclosed. The system relies upon pre-generating a series of key expression images from a single neutral image using a pre-trained generative adversarial neural network. The key expression images are used to generate a set of FACS expressions and associated textures which may be applied to a three-dimensional model to generate facial animation. The FACS expressions and textures may be provided to a mobile device to enable that mobile device to generate convincing three-dimensional avatars in real-time with convincing animation in a processor non-intensive way through a blending process using the pre-determined FACS expressions and textures.

17 Claims, 12 Drawing Sheets
(8 of 12 Drawing Sheet(s) Filed in Color)

(56) References Cited

U.S. PATENT DOCUMENTS

2015/0084950 A1\* 3/2015 Li .......................... G06T 7/251
                                                                345/419
2018/0033189 A1\* 2/2018 Ma ......................... G06T 13/40

OTHER PUBLICATIONS

Queiroz, Rossana B., Adriana Braun, and Soraia Raupp Musse. "A framework for generic facial expression transfer." Entertainment Computing 18 (2017): 125-141. (Year: 2017).\*

Cole, Forrester, et al. "Synthesizing normalized faces from facial identity features." Proceedings of the IEEE conference on computer vision and pattern recognition. 2017. (Year: 2017).\*

Olszewski, Kyle, et al. "Realistic dynamic facial textures from a single image using gans." Proceedings of the IEEE International Conference on Computer Vision. 2017. (Year: 2017).\*

Zhou, Yuqian, and Bertram Emil Shi. "Photorealistic facial expression synthesis by the conditional difference adversarial autoencoder." 2017 seventh international conference on affective computing and intelligent interaction (ACII). IEEE, 2017. (Year: 2017).\*

Huang, Yuchi, and Saad M. Khan. "Dyadgan: Generating facial expressions in dyadic interactions." Proceedings of the IEEE Conference on Computer Vision and Pattern Recognition Workshops. 2017. (Year: 2017).\*

\* cited by examiner

REAL-TIME AVATARS USING DYNAMIC TEXTURES

RELATED APPLICATION INFORMATION

This patent claims priority from U.S. provisional patent application No. 62/718,285 entitled "Real-Time Avatars Using Dynamic Textures" filed Aug. 13, 2018.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the creation of a realistic digital, animated avatar based upon a single image.

Description of the Related Art

One aspect of three-dimensional rendering of human faces that has been persistently difficult is realistic facial animations. Simply generating and rendering an overall facial shape that largely corresponds to the facial shape of a particular person or to a modelled person has been relatively straightforward for a number of years. Microsoft® Kinect®-like infrared scanners have been capable of using infrared light and associated cameras to develop facial models for several years. In more scientific or serious creative spaces, complex rigs of cameras, lighting, and three-dimensional capture systems have been able to generate extremely detailed three-dimensional maps of individual faces for years as well.

Relatedly, facial textures can be generated by several different methods, some simple and some complex. Typically, the more complex methods result in more accuracy. However, several of the inventors of this patent also invented methods reliant upon a single image to create realistic facial features. Those methods rely upon a trained neural network to predict the features of a face based upon a single input image. The training utilizes detailed textural and depth maps of many human faces to train the neural network as to what is likely to be the characteristics of a face (depth, coloring, texture, etc.) that correspond to individual front-facing images. The results of that work may be seen in co-pending U.S. patent application Ser. No. 15/829,064 entitled "Photorealistic Facial Texture Inference Using Deep Neural Networks". Somewhat relatedly, techniques disclosed in co-pending U.S. patent application Ser. No. 16/119,907 entitled "Avatar Digitization from a Single Image for Real-Time Rendering" from some of the same inventors can be used to generate an entire facial model and textures from a single input image.

However, one aspect of the avatar generation process, particularly from a single image, has been elusive. The single model from the avatar is quite convincing. The subsequent animation of that avatar to correspond to desired facial animations, for example using the Facial Action Coding System (FACS) that is commonly used in both research and in video games, has proven difficult.

Generally speaking, animating an avatar generated from a single image typically results in artifacts, e.g., unusual elements, the eyes tend to be uncanny or have issues, the mouth tends to be shaped unusually and tearing is introduced when an associated texture is "stretched" as a mouth moves to speak or yawn. Further, the facial features or texture in particular tends to become deformed when applied to a three-dimensional model that is animated. In short, the results are less than excellent.

DESCRIPTION OF THE DRAWINGS

The patent or application file contains at least one drawing executed in color. Copies of this patent or patent application publication with color drawing(s) will be provided by the Office upon request and payment of the necessary fee.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
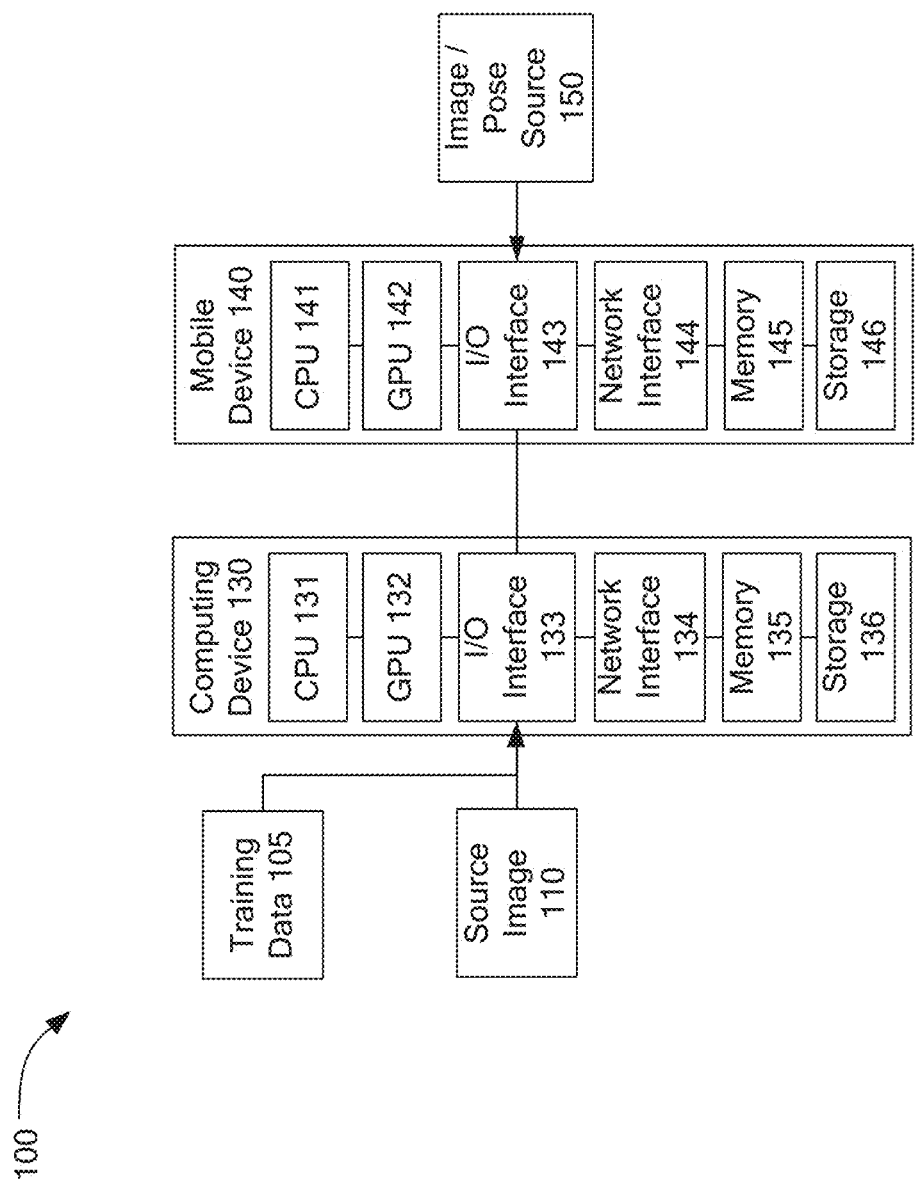
FIG. 1 is a structural diagram of a system for generating real-time avatars using dynamic textures.

FIG. 1 is a structural diagram of a system 100 for generating real-time avatars using dynamic textures. The system 100 includes training data 105, an image source 110, a computing device 130, a mobile device 140, and an image/pose source 150. The mobile device 140 is essentially the same as the computing device 130, but the devices are shown as distinct because the capabilities of one device (e.g. the mobile device 140) may be less than those of the computing device 130. The image source 110 may be storage (e.g. storage 136) on the computing device 130 itself or may be external (e.g. a camera). The various components may be interconnected by a network The training data 105 is preferably a set of two-dimensional images of faces as well as fully modelled versions of the same faces including associated facial textures. The two-dimensional images and fully modelled and textured faces (typically captured using high-resolution camera rigs and infrared mapping) enable the generative portion of the generative adversarial network ("GAN") to "learn" what typical face textures result from corresponding two-dimensional images. It also allows the discriminator portion of the generative adversarial network work with the generative to "knock out" or exclude faces that are inadequate or otherwise do not make the grade. If the training is good, over time, the GAN becomes better at creating realistic facial textures for each model (e.g. each expression) and the discriminator becomes more "fooled" by the real or fake determination for the resulting face.

The source image 110 may come from a still camera or a video camera capturing an image. The source image 110 may be from a short term or long-term storage device holding data that represents images. For example, the source image 110 may come from a database of images, may be the Internet, or may be any number of other sources of image data. The associated image data, as discussed more fully below, is explicitly not an image generated using any complex lighting or capture system, or any high-resolution depth sensors such that any actual facial texture data is contained within the image data itself. Instead, the image is a typical, two-dimensional image format such as PNG, JPG, BMP, and may be in almost any resolution, so long as a face is recognizable as human. In the testing done for this patent, the image used was 128 pixels by 128 pixels.

The computing device 130 includes a central processing unit (CPU) 131, a graphics processing unit (GPU) 132, an input-output (I/O) interface 133, a network interface 134, memory 135, and storage 136.

The CPU 131 may execute instructions associated with an operating system for the computing device 130 as well as instructions associated with one or more applications suitable for enabling the functions described herein. The CPU 131 may be or include one or more microprocessors, microcontrollers, digital signal processors, application specific integrated circuits (ASICs), or systems-on-a-chip (SOCs). The CPU 131 may be specialized, designed for operations upon visual, graphical, or audio data, or may be general purpose processors. Though identified as a central processing unit, the CPU 131 may be multiple processors, for example, multi-core processors or a series of processors joined by a bus to increase the overall throughput or capabilities of the CPU 131.

The GPU 132 may execute instructions suitable for enabling the functions described herein. In particular, the GPU 132 may be used in connection with particular image-related operations which the GPU 132 is uniquely suited to perform. The GPU 132 may be any of the things that the CPU 131 is. However, the GPU 132 is distinct in that it is a specialized processor that is designed for the purpose of processing visual data, particularly vector and shading, and performs faster memory operations and access, along with performing specialized lighting operations. The instruction sets and memory in the GPU 132 are specifically designed for operation upon graphical data. In this way, the GPU 132 may be especially suited to operation upon the image data or to quickly and efficiently performing the complex mathematical operations described herein. Like the CPU 131, the GPU 132 is shown as a single graphics processing unit, but may be one or more graphics processing units in a so-called multi-core format, or linked by a bus or other connection that may together be applied to a single set of or to multiple processing operations.

The I/O interface 133 may include one or more general purpose wired interfaces (e.g. a universal serial bus (USB), high definition multimedia interface (HDMI)), one or more connectors for storage devices such as hard disk drives, flash drives, or proprietary storage solutions.

The network interface 134 may include radio-frequency circuits, analog circuits, digital circuits, one or more antennas, and other hardware, firmware, and software necessary for network communications with external devices. The network interface 134 may include both wired and wireless connections. For example, the network may include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol.

The network interface 134 may include one or more specialized processors to perform functions such as coding/decoding, compression/decompression, and encryption/decryption as necessary for communicating with external devices using selected communications protocols. The network interface 134 may rely on the CPU 131 to perform some or all of these functions in whole or in part.

The memory 135 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 135 may store software programs and routines for execution by the CPU 131 or GPU 132 (or both together). These stored software programs may include operating system software. The operating system may include functions to support the I/O interface 133 or the network interface 134, such as protocol stacks, coding/decoding, compression/decompression, and encryption/decryption. The stored software programs may include an application or "app" to cause the computing device to perform portions or all of the processes and functions described herein. The words "memory" and "storage", as used herein, explicitly exclude transitory media including propagating waveforms and transitory signals.

Storage 136 may be or include non-volatile memory such as hard disk drives, flash memory devices designed for long-term storage, writable media, and other proprietary storage media, such as media designed for long-term storage of image data.

In some cases, one or more additional computing devices, like computing device 130, may be connected by the network interface 134 which may be a wired interface, such as Ethernet, universal serial bus (USB), or a wireless interface such as 802.11x, LTE, or other wireless protocol to enable the additional, computing devices to perform some or all of the operations discussed herein. For example, the CPU 131 and GPU 132 of the computing device 130 may be less powerful than that available in a connected system (e.g. a multicore process or group of multicore processors) or a group of GPUs (e.g. a single powerful GPU or a set of GPUs interconnected by SLI or CrossFire®) such that a connected computing device is better-capable of performing processor-intensive tasks such as the convolution or segmentation processes discussed more fully below. In some implementations, the one or more additional computing devices may be used to perform more processor-intensive tasks, with the tasks being offloaded via the I/O interface 133 or network interface 134. In particular, the training processes discussed herein may rely upon external computing devices.

One such additional computing device may be the mobile device 140, which includes corresponding CPU 141, GPU 142, input/output interface 143, network interface 144, memory 145, and storage 146. Those components have identical or similar structures and function to those described with respect to the computing device 130, so that description will not be repeated here. However, the mobile device 140 is relevant to this disclosure since it may be less powerful than the computing device 130. As a result, some functions, particularly the training of the GAN and the generation of key expressions (discussed below) are presently suitable only for operation on a computing device 130 that specifically includes a suitable GPU 132. Typically, at present, mobile device 140 GPUs, like GPU 142 are not adequate to the task. In the future, this will become less likely. Therefore, in the future, all of the methods described herein could take place on a mobile device itself.

The image/pose source 150 is an image from which pose and model data is gathered. For example, the image/pose source 150 may be a still image or a single video frame or series of frames from which a pose is extracted (e.g. using depth sensing technologies, or through the application of a trained machine learning). That pose information may then be used by the mobile device 140, as described below, to generate a real-time avatar including a suitable facial texture as described more fully below. In some cases, the source image 110 and the image/pose source 150 may be the same, but as will become clear below, this is not commonly the case.

Figure 2:
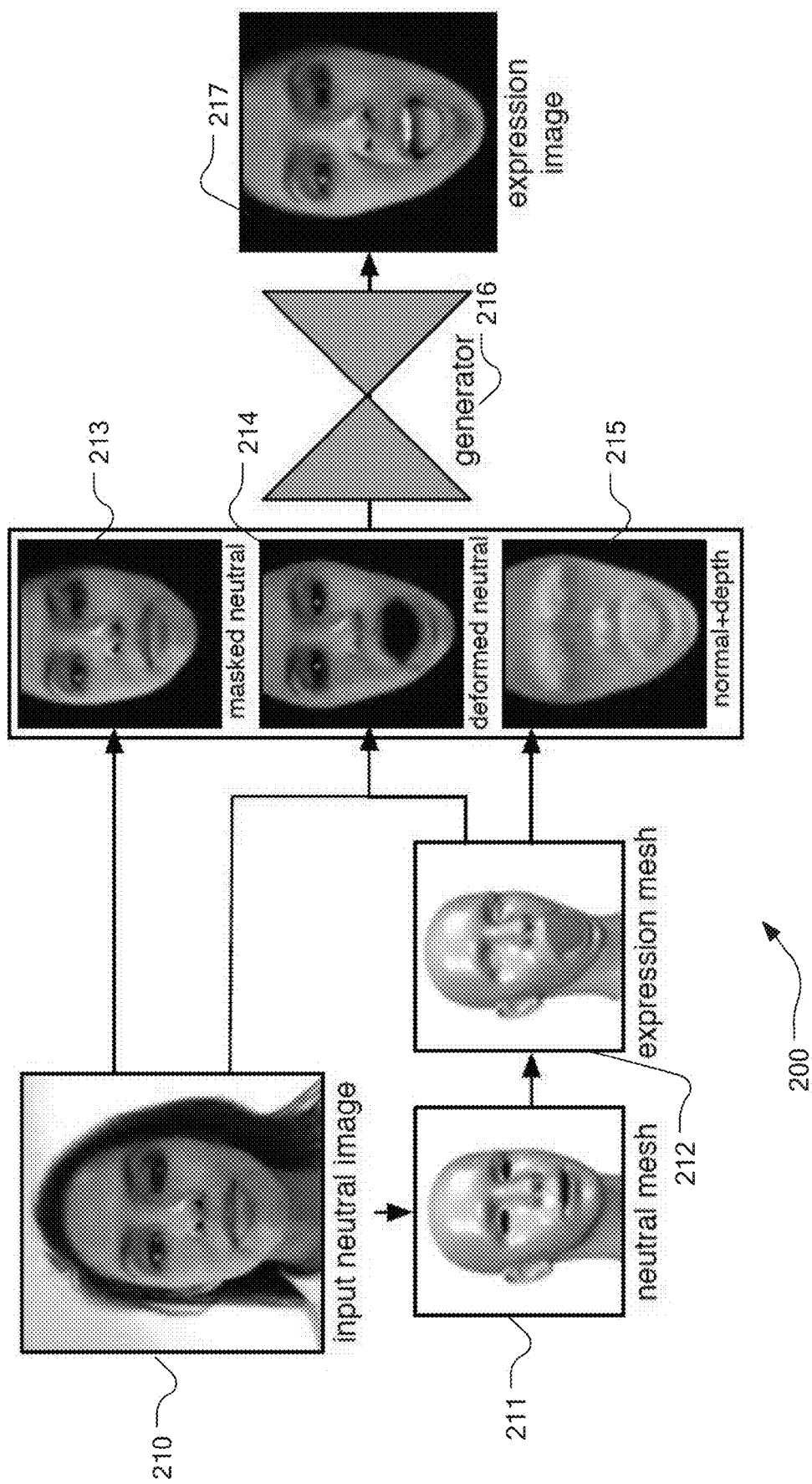
FIG. 2 is a functional diagram of a generative adversarial network used in creating real-time avatars using dynamic textures.

FIG. 2 is a functional diagram of a generative adversarial network used in creating real-time avatars using dynamic textures. The functions 200 shown are used to create a series of several "key expressions" that may be used to generate a set of FACS textures. The functions 200 shown are for one expression, but may take place many times to generate multiple key expressions.

The functions 200 rely upon an input neutral image 210. This image is preferably a "neutral" image, meaning that it is an image without any particular facial expression presented thereon. The neutral is intentional, because it is one that is relatively similar across all faces. This image may be provided to the GAN and a neutral mesh 211 may be assumed to apply to the neutral image. The neutral mesh 211 is a three-dimensional model for "holding" or modelling the expected shape of the person's head/face from the input neutral image 210.

An expression mesh 212 may be created as a normalized or default mesh for a desired expression. The expression shown may be modelled, for example, in FACS, and be a set of so-called "action units" that represent an overall facial shape or intended emotional expression. For example, the expression shown in the expression mesh 212 may be a "yell" or may be an expression of "surprise."

The GAN relies upon three primary components, the first is the masked neutral image 213. This is an image 213 that has separated the facial components from the rest of the image. This may be segmented (e.g. separated from the rest of the image) in any number of ways. The deformed neutral image 214 is an image that simply stretches and approximates the masked neutral as though it were wrapped on top of the expression mesh 212. The deformed neutral image 214 may also incorporate gaze estimation for an expected gaze (based upon neural network training) for the expression. Finally, the normal and depth image 215 takes a matching perspective (e.g. front-facing) view of the desired expression mesh and maps it to a depth map. In this way, the GAN generator 216 has an expected face in a neutral pose (the masked neutral image 213), a rough approximation of the expected expression based directly upon the neutral pose (the deformed neutral image 214) and a depth map (the normal and depth image 215) from which to generate a convincing image. Other than the deformed neutral 214, these correspond to the components used to train the GAN generator 216 in the first place. In response, the GAN outputs an expression image 217. As discussed more fully below, the mouth and eyes are generated separately from the facial mask.

Figure 3:
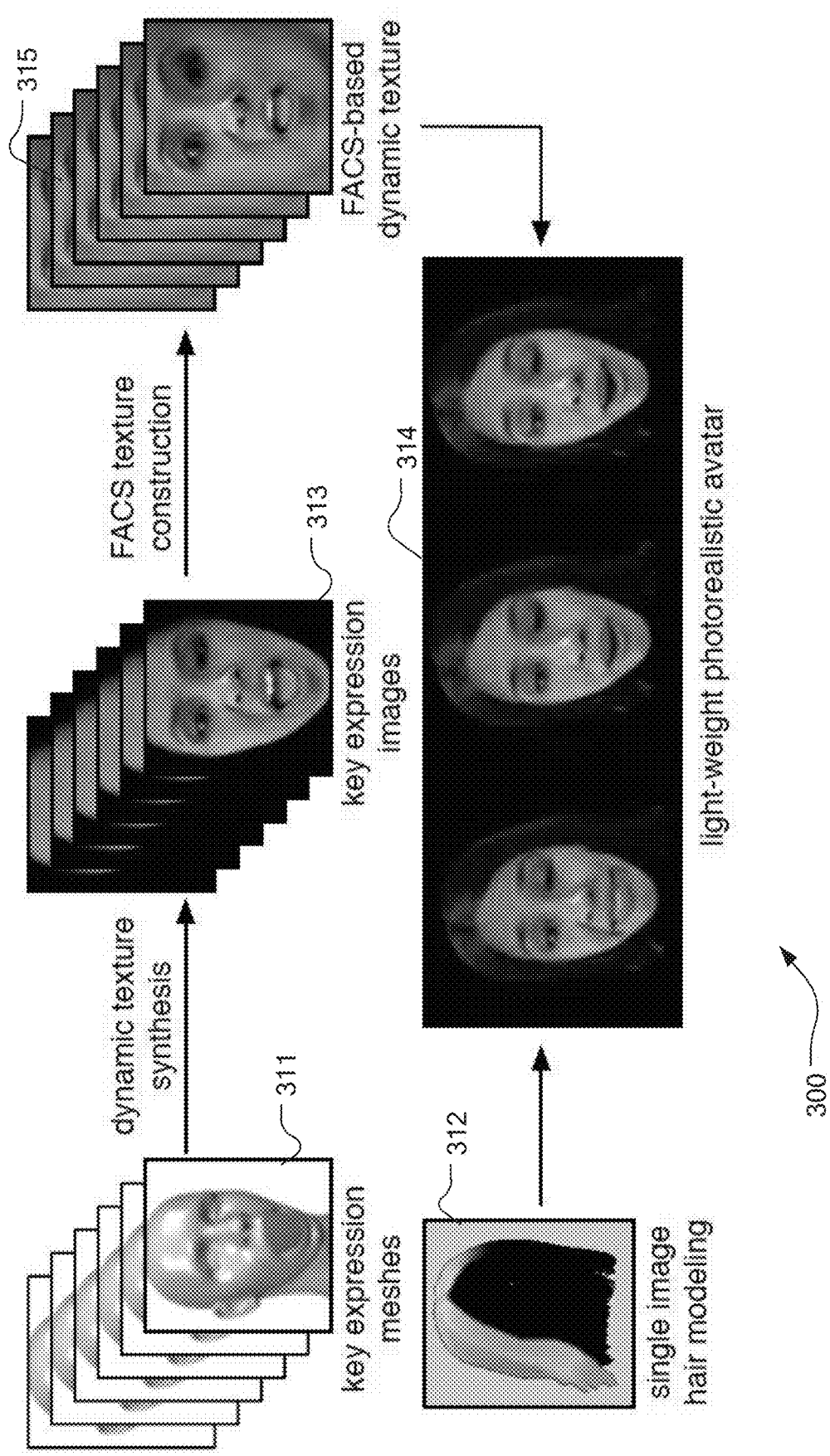
FIG. 3 is a functional diagram of a process for using generated key expression meshes and images to create blendshape texture maps for animation of an avatar in real-time.

FIG. 3 is a functional diagram of a process for using generated key expression meshes and images to create blendshape texture maps for animation of an avatar in real-time. These functions may take place partially on a computing device (e.g. computing device 130) and partially on a mobile device (e.g. mobile device 140) due to limitations of the mobile device.

First, after receipt of the neutral image discussed above with respect to FIG. 2, a series of key expression meshes 311 are used in conjunction with the GAN generator 216 and the neutral image 211 to generate a series of key expression images 313. These key expression images 313 are a set of images of the face shown in the neutral image 211 in a set of "key expressions". The key expressions are intended to be a broad set of expressions with sufficient differences between them that those expressions correspond to sufficiently distinct facial poses and textures such that most desired expressions fall somewhere between two or more of those key expressions. In the testing done for this disclosure, a series of only six key expressions proved of sufficient robustness to be used for extremely accurate purposes.

Those key expressions may be used, for example, by a computing device 130, to generate a set of FACS facial textures 315. These FACS facial textures may be equal in number to the key expressions, but, in testing, 36 FACS facial textures and activation masks were created. The FACS facial textures 315 are generated using activation masks relative to the neutral image 211 and based upon the desired expression mesh. More than 36 may be used, but 36 was found to be adequate to the task. Also, FACS facial textures are only one example of a suitable way to represent the facial textures. Other methods and systems for representing the facial textures and meshes may be used as well.

Once the FACS facial textures are created, they require relatively low resources to transmit and store. Therefore, a mobile device, like mobile device 140, may store the FACS facial textures. The FACS facial textures may be used, in conjunction with single image hair modelling 312 to create a real-time photorealistic avatar 314. In particular, the FACS facial textures may be manipulated in a non-processor intensive way by the mobile device 140 to generate realistic avatars in real time. If desired, the expressions to be modelled may be gathered by the same mobile device 140 (e.g. a camera or depth-sensing camera) to create an avatar that mirrors the individual's expressions being made in real-time. Examples of resulting expressions are shown in the real-time photorealistic avatar 314.

Figure 4:
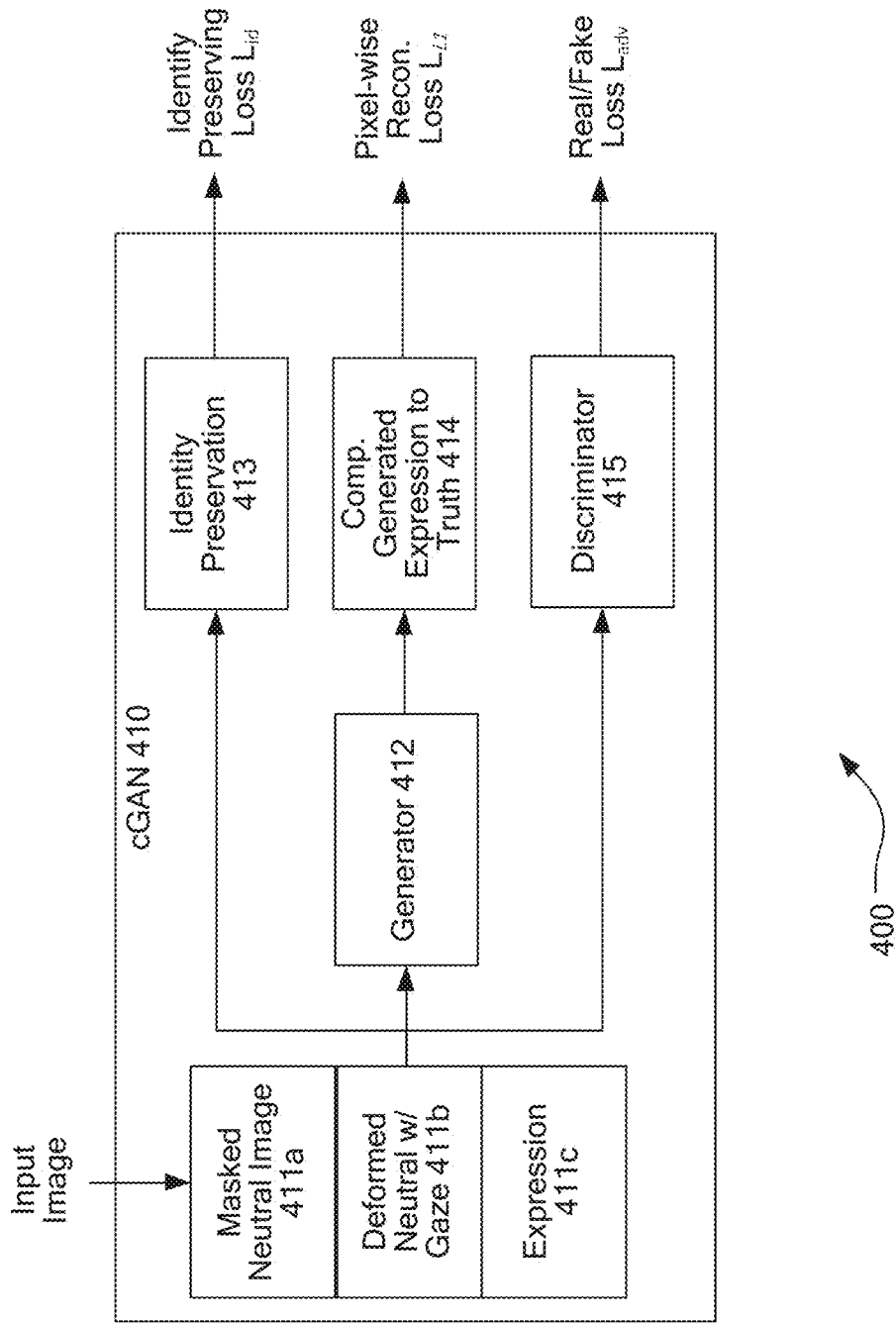
FIG. 4 is a functional diagram of a conditional generative adversarial network used to generate key expressions.

FIG. 4 is a functional diagram 400 of a conditional generative adversarial network 410 used to generate key expressions. Given a neutral front input image I, an initial mesh is generated $M_I=(\alpha_I, \beta_I, R_I)$, where $\alpha_I$ and $\beta_I$ are the respective identity and expression coefficients of the fitting to image I, and $R_I$ encodes the orientation parameters (e.g. rotation and translation of the mesh). From that, the face texture $T_I$ which is unwrapped form I to the UV-space (e.g. no shadows for depth in the texture itself, the shadows are introduced by the mesh itself later).

Each desired expression E may have blendshape coefficients $\beta_E$ and rigid transformation parameters $R_E$. M may be derived by replacing the expression blendshape coefficients to obtain the mesh $M_E=(\alpha_E, \beta_E, R_E)$. A dataset with varying poses for faces (e.g. with up to 45 degrees of rotation in every direction from a neutral—face on—pose) is desirable to enable the GAN to create faces with corresponding ranges of pose.

The input to the cGAN 410 may be characterized as:

$$A_I=(I,\Phi(M_E),\delta(M_E),\Gamma(I),\rho(M_E,T_I))$$

where $\Phi(M_E)$ is an image of the rendered normal directions of $M_E$ 411a, $\delta(M_E)$ is the depth map 411c of the desired expression, $\Gamma(I)$ is a masked-image encoding the direction of gaze, and $\rho(M_E, T_I)$ is a rendered image of $M_E$ using the input texture $T_I$, which is referred to herein as a "deformed neutral" 411b or a "deformed neutral image." The images may be aligned by basing each upon the camera space of M.

$I_E$ may be derived using a pix2pix or similar framework to infer the real face image with the desired facial deformations (e.g. an approximation of the expression). The resulting $I_E$ is quite similar on a pixel-by-pixel basis with $\rho(M_E, T_I)$. For example, non-moving or expressionless (i.e. static) features of the two textures will remain essentially, if not actually, identical. The deformations caused by $\beta_E$ can be explained by the fitted mesh $M_E$ normal and depth data.

After it has been trained, the generator 412 attempts to generate the image $I_E$ from the inputs (I, $\Phi(M_E)$, $\delta(M_E)$, $\Gamma(I)$, $\rho(M_E, T_I)$). The loss is given in three components which may represented as $L_{id}$, $L_{l1}$ and $L_{adv}$. The total loss is given as:

$$L=\lambda_{adv}L_{adv}+\lambda_{id}L_{id}+\lambda_{l1}L_{l1}$$

where $L_{adv}$, $L_{id}$, and $Li_1$ are the adversarial, identity preserving and the pixel-wise Manhattan reconstruction loss, respectively.

The adversarial loss is generated by training the discriminator 415 portion of the GAN to distinguish between a real hextuple $$(I,\Phi(M_E),\delta(M_E),\Gamma(I),\rho(M_E,T_I),I_E)$$

and a generated one $$(I,\Phi(M_E),\delta(M_E),\Gamma(I),I_{Egt},G(.))$$

Where $I_{Egt}$ refers to the rendered blendshape fit to the ground-truth (actual) image of the actor performing expression E. The adversarial loss $L_{adv}$ is given by taking the log(D(G(.)).

The pixel-wise loss $Li_1$ is defined as the $\|G(.)-I_E\|_1$, which is the sum of pixel-wise absolute differences between the generated expression image and the ground-truth expression image E. This is created simply by comparing the generated expression and texture with an actual image of the individual 414.

Identity preservation 413 creates the identify preserving loss $L_{id}$ relies upon a prior art model to compute a 256-dimension feature vector encoding the identity of the subject's face, the introducing the preserving loss (below) to enforce the identity-likeness between $I_0$ and the generated image:

$$L_{id}=\|F(I)=F(G(A_I))\|_1$$

Description of Processes

Figure 5:
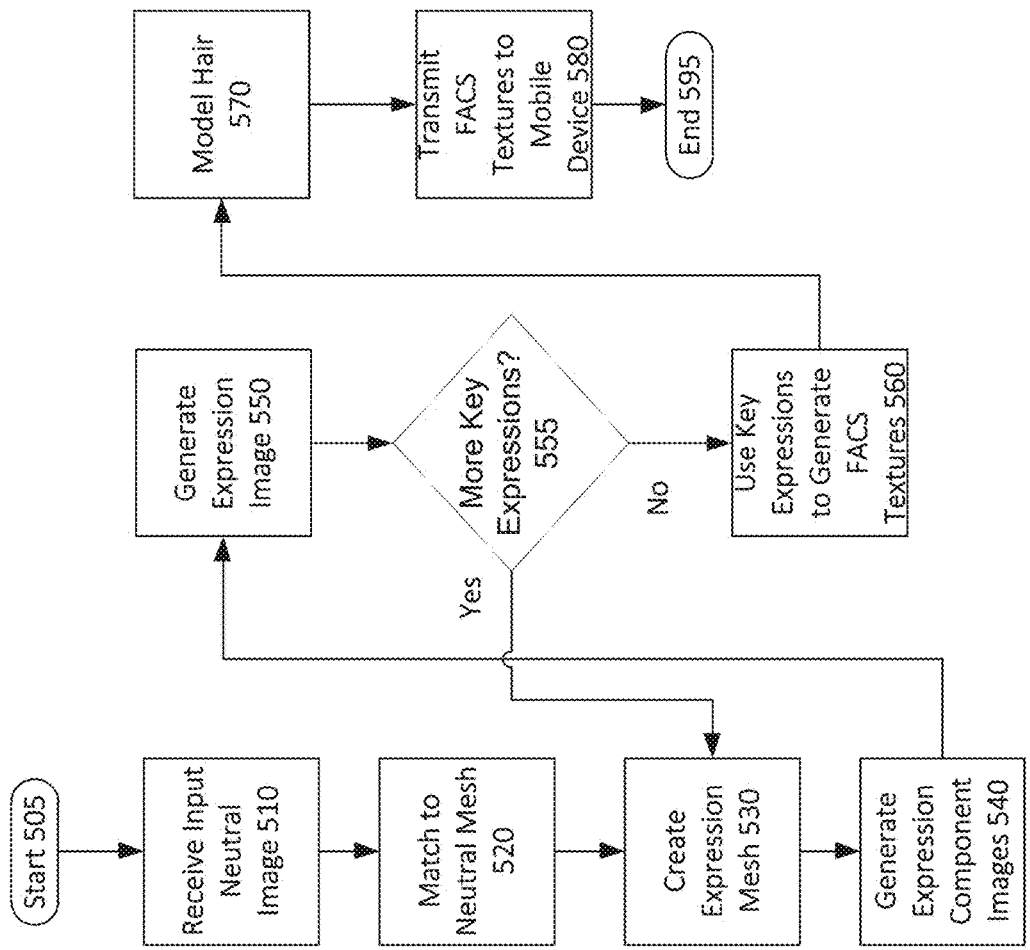
FIG. 5 is a flowchart of a process for generating a series of three-dimensional meshes and blendshape texture maps from a single image.

FIG. 5 is a flowchart of a process for generating a series of three-dimensional meshes and blendshape texture maps from a single image. The process begins at start 505 and continues until end 595. The process is shown as a single iteration, but may take place many times, even many times in rapid succession. For example, multiple frames of video may be fed into the system in rapid succession or a number of individual initial images may be provided for which synthesized textures are desired. The process of FIG. 5 assumes that the GAN has already been trained. That discussion is limited in this disclosure.

After the start 505, the process begins with receipt of a neutral image at 510. This neutral image is an image in a neutral pose, such as the pose shown in element 210 of FIG. 2. The intention is that the pose does not have any particular expression. The neutrality of the pose aids in establishing a baseline for translating the neutral pose into the expressions, for example, expressions derived from FACS. The neutral pose is useful because it enables a place from which the GAN was trained to derive the expressions desired. The neutral image may come from a still camera, a frame of video, or some other source.

The neutral image is an image from which expressions will be generated. As indicated above, the process of creating the key expressions and translating them to FACS may preferably take place on a computer, like computing device 130, that is better suited to the operation of neural networks and to complex graphical renderings and mathematical calculations. As a result, the majority or all of the process described with respect to FIG. 5 may take place on such a computing device. However, in some cases, a mobile device or single computing device may perform all of the processes of FIG. 6 and, as discussed later, FIG. 7. Preferably, for now, those processes are undertaken separately.

Following receipt of the neutral image, the neutral image is superimposed or matched to a neutral facial mesh which is a three-dimensional model of a face in a neutral (expression) pose. This neutral mesh may be generic (e.g. a single mesh for all input images) or may be partially or wholly defined by user input characteristics (e.g. a female or male mesh may be distinct or a child or adult or older person mesh may be distinct). Preferably, if there are multiple meshes available, the GAN has been trained to select the most likely mesh that best fits the input neutral image.

The GAN next creates the expression mesh 530. This is a three-dimensional model of a face in a desired expression pose. This desired expression pose may be specially selected by a user or administrator. Alternatively, this pose is one of a set of poses that has been selected as representative of a wide array of expressions. These expressions, as mentioned briefly above, may be called "key expressions". Though described as "creation" in step 530, this may be merely retrieval of a desired mesh from a database or other storage for a set of meshes for the desired key expressions.

To reach the desired key expression, the generator portion of the GAN calculates an expression component to effectively predict the received neutral image's "version" of the desired expression at 540. This process is described above with respect to FIGS. 2 and 4. The process is reliant upon generation of the neutral image received, a "deformed neutral" and a mesh of the desired expression. These are the expression component images (and mesh).

The generator then produces an expression image 550, which is the desired key expression image based upon the neutral image received at step 510. This key expression is stored. In practice, the system used by the inventors of this patent relies upon six key expressions. Other implementations may use fewer or more key expressions.

Next, a determination is made whether there are additional key expressions at 555. The additional key expressions refer to the desired number of key expressions for the given implementation. As indicated above, six key expressions were used in the implementation by the inventors, but other numbers of key expressions may be generated. If so ("yes" at 555), then the process continues with creation of another expression mesh at 530 and the process repeats.

If all key expressions have been created ("no" at 555), then the process continues with the generation of FACS textures from the key expressions at 560. This process is useful to enable the use of the generated FACS textures in mobile device environments. This translation, as well as the operation of the GAN to generate the key expressions is processor intensive in a way that is not currently suitable for mobile devices. However, if a suitable number of FACS textures is generated in response to an input neutral image, then those FACS textures may be provided to the mobile device and, thereafter, the mobile device can generally operate to provide real-time, convincing, animated avatars based upon that neutral image.

At 560, the key expressions are used to generate FACS textures for later transmission to a mobile device (or subsequent low computation use by the same system) to generate real-time animated avatars. To perform this translation from key expression to FACS, for each texture map $T_e$ having each blendshape $e \in \varepsilon$, where $\varepsilon$ is the set of blendshapes in the model, each of which correspond to a FACS action (e.g. an expression), a linear combination of the associated textures, weighted by the expression blendshape coefficients of the fitting, may be used to generate an output FACS texture. However, the translation from the key expression to the FACS expression is not precisely linear, so direct linear blending will not work. Instead, a UV activation mask is applied for each expression by taking a per-vertex deformation magnitude of each expression from a neutral pose. The result is a non-linear activation mask which acts essentially as a deformation instruction to translate between the key expression and the FACS expression in each vector.

Mathematically, given the expression $e \in \varepsilon$, and a neutral mesh M, the activation mask $A_e$ at vertex y in the UV space is defined as $A_e = \|e(v) - M(v)\|_2$. Simply put, the mask's value for a given vertex v is the magnitude of the deformation at that vertex.

Given all of that, the final texture at pixel v for expression blendshape coefficients $\{\alpha_e\}$ can be computed as $$c(v) = \sum_{e \in \varepsilon} \alpha_e \cdot T_e(v) \cdot A_e(v)$$

This is not entirely complete, however, because certain poses are unusual (e.g. raising a single eyebrow). To account for this, the associated textures are first inferred using the set of key expressions K that were easily performed by an actual person. Those key expressions are used to generate a set of facial expressions that may be used to generate FACS texture maps. For a given $k \in K$, its expression blendshape coefficients are denoted by $W_k$ computed by averaging the weights across the associated GAN training data as $$k = \sum_{e \in \varepsilon} W_{ke} \cdot e$$

The associated key expression activation masks $Y_k$ are given by $$Y_k = \sum_{k \in K} T_k(v).$$

Figure 6:
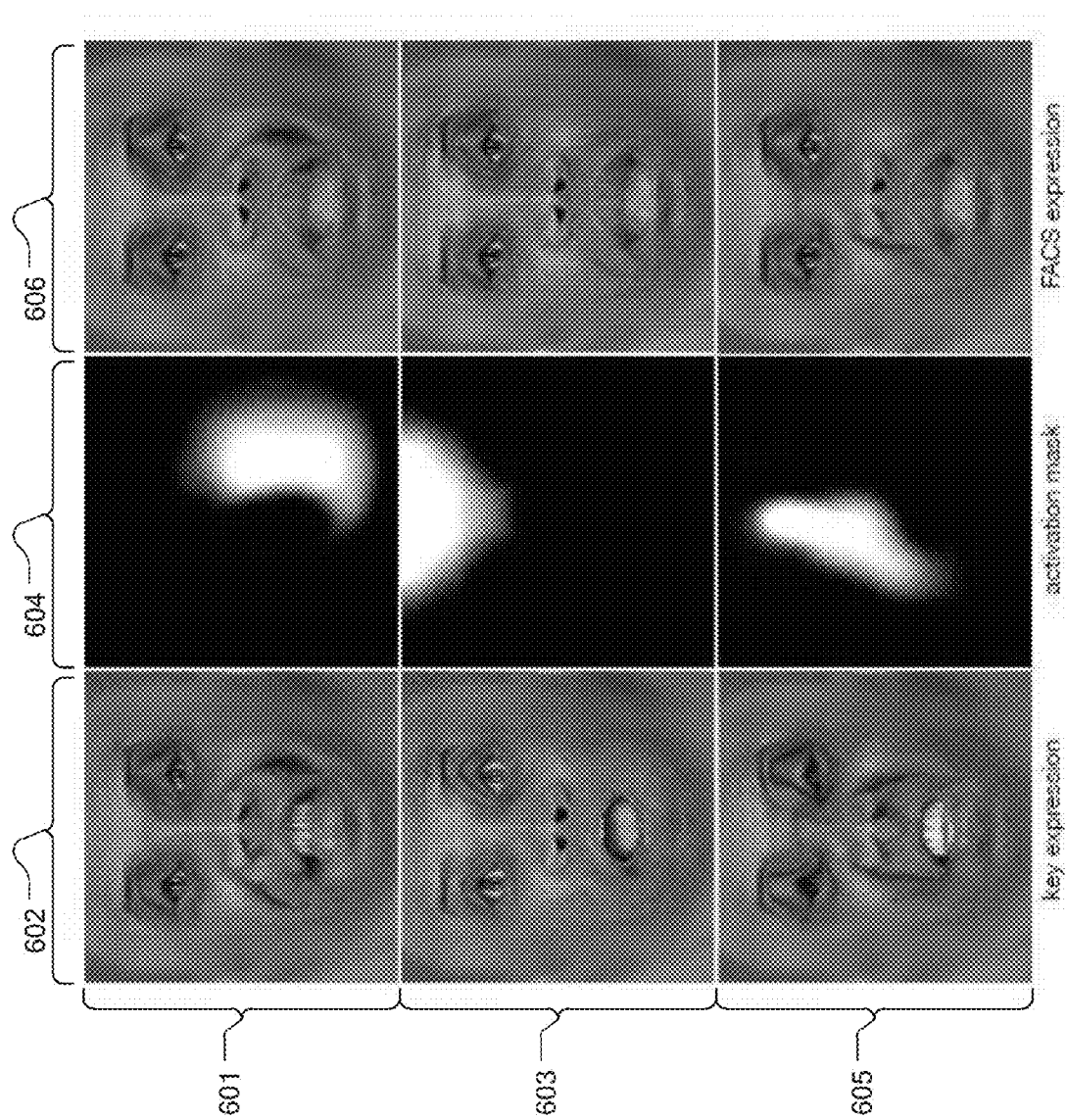
FIG. 6 is a set of activation masks for conversion of a key expression into a three-dimensional mesh and blendshape texture map combination.

Yk(v). FIG. 6 is a set of activation masks for conversion of a key expression into a three-dimensional mesh and blendshape texture map combination. The associated key expressions for poses 601, 603, and 605 are shown in column 602. The activation masks to translate those into FACS expressions are visible in column 604. Only the portions of the expression that should be activated are highlighted. The darker portion of the activation mask is not included in the FACS expression. Using this process, the FACS expressions are generated based upon the key expressions. In the implementation by the inventors, a total of 36 FACS expressions were used, but more or fewer may be used depending on the particular implementation. Though not shown, those FACS may be stored for that neutral image.

Returning to FIG. 5, the hair is then modelled at 570. This may be done in a number of suitable ways. One such method is disclosed in co-pending U.S. patent application Ser. No. 16/119,907 entitled "Avatar Digitization from a Single Image for Real-Time Rendering" by some of the inventors here. The hair is modelled, preferably in three dimensions, but the modelling may only be in two-dimensions for overlay on top of the associated expression images in some cases.

Finally, the FACS textures are transmitted to a mobile device 580. The process then ends at 595.

These FACS textures may be used, subsequently, to enable the mobile device to generate expression for real-time generated avatars (e.g. a facial overlay based upon the neutral image provided). In this way, an individual may digitally wear an augmented reality or mixed reality "mask" that appears as another person. If the individual's mobile device is capable of such things, the mobile device may capture expressions, translate those expressions into a FACS system, and use the FACS textures to generate real-time expressions for the neutral face image (e.g. the "mask"). That process is described below with respect to FIG. 7.

Figure 7:
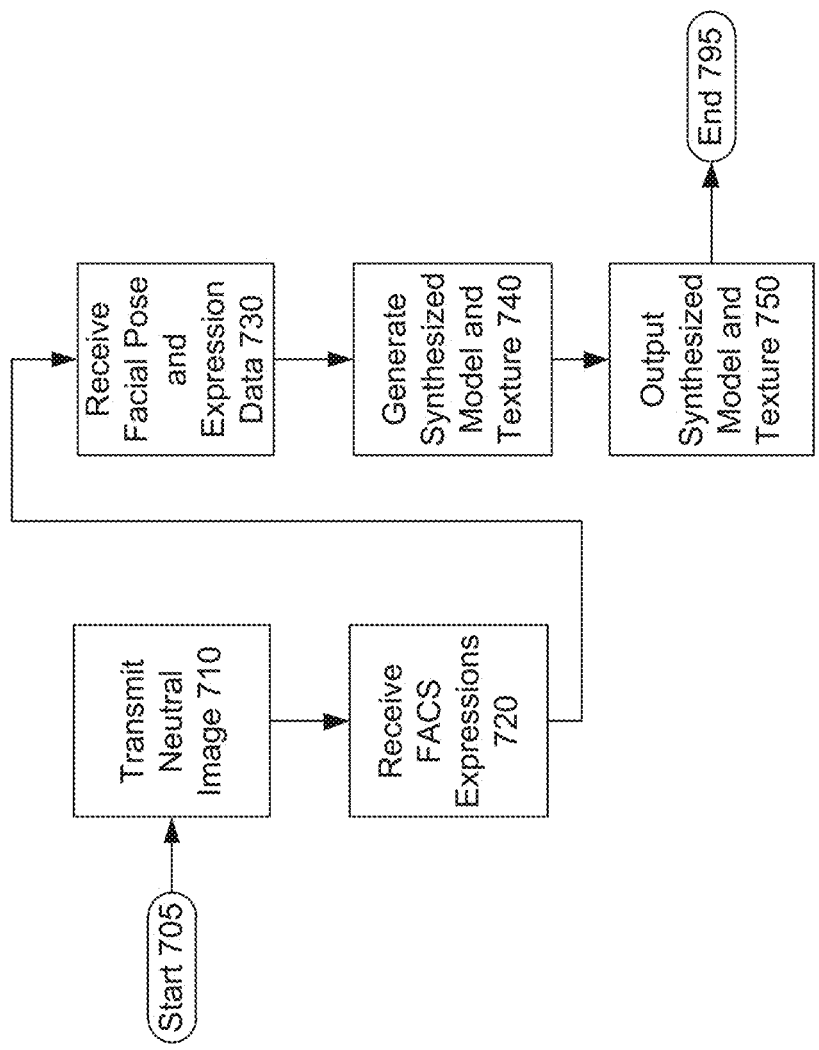
FIG. 7 is a flowchart of a process for generating real-time facial animation on a computing device based upon a set of three-dimensional meshes and blendshape texture maps.

FIG. 7 is a flowchart of a process for generating real-time facial animation on a computing device based upon a set of three-dimensional meshes and blendshape texture maps. This process has a start 705 and an end 795, but may take place many times, may iteratively take place, for example, as additional pose data arrives, or upon receipt of additional frames of video.

Following the start 705, the process begins with transmission of a neutral image at 710. This step involves the providing of a neutral image to the GAN so that the GAN may create a set of FACS expressions for use by the mobile device. If the process is to take place on the same computing device, this transmission may not occur. Transmission may occur some substantial amount of time before output of a desired avatar is requested to enable the system time to generate the associated FACS expressions.

At step 720, the associated FACS expressions (e.g. FACS textures) are received by the mobile device. A set of thirty-six FACS textures for a desired set of expressions was used in the implementation by the inventors. From these thirty-six FACS textures, almost any synthesized expression can be quickly generated.

At some point later, facial pose and expression data is received by the mobile device at 730. This data may be generated in real-time from a depth sensing camera or even from an optical camera that uses one or more methods (e.g. machine learning) to determine a pose and/or expression for a given user in real time. For example, a user may be using a "selfie camera" mode on a mobile device (e.g. mobile device 140) to capture images of him or herself. That camera may include depth data or may not. But in either case, pose and expression data may be generated as a result, and that pose and expression data may be translated into a FACS set of actions.

Using that FACS set of actions, and the pre-generated and received FACS textures (see FIG. 5, element 580), a synthesized model and facial texture is generated at 740. The process is computationally simple enough that the FACS textures and blendshapes the textures of multiple FACS textures that are nearest-to the desired expression may be linearly blended by the mobile device to generate a desired texture. The model for the face may be generated separately and is generally outside of the scope of this disclosure.

Finally, a synthesized model including the generated textures may be output at 750. This output may be, for example, the superimposition of a model and texture for the head of another individual on top of a real-time image capture of one individual. In this way, the other may appear to be that individual or a reasonable facsimile thereof. Importantly, the linear blending may be accomplished in real-time, as a user is speaking, moving, or generating new expressions, without any visible delay because the FACS expressions were pre-calculated by the computing device separately. The process then may end at 795.

The generation of suitable eyes with reasonable gaze is handled in a similar manner to that of the faces. Specifically, approximately 20 eye textures are generated based upon the neutral image, then FACS are created separately for those eye textures. Each eye texture has a different gaze (e.g. top, middle center, left, right, slightly left, slightly right, slightly down, etc.). Those textures are provided, once created, to the mobile device as well.

The inner mouths are also separately generated. The mouths are all generic to any individual, but are convincing. A total library of many mouths (e.g. 300 in the implementation by the inventors) is created with various geometric configurations of the mouth. Then, a synthesized mouth is created using a per-pixel weighted median of a large group of the closest mouths in similarity to the desired FACS expression. In this way, the mouth is wholly fictitious, but is convincingly like a real mouth and avoids tearing and other artifacts that are introduced by prior art methods reliant upon the actual content of the images which do not include an open mouth (as is the case in the neutral pose image used here). The mouth is then separately added to the model.

Figure 8:
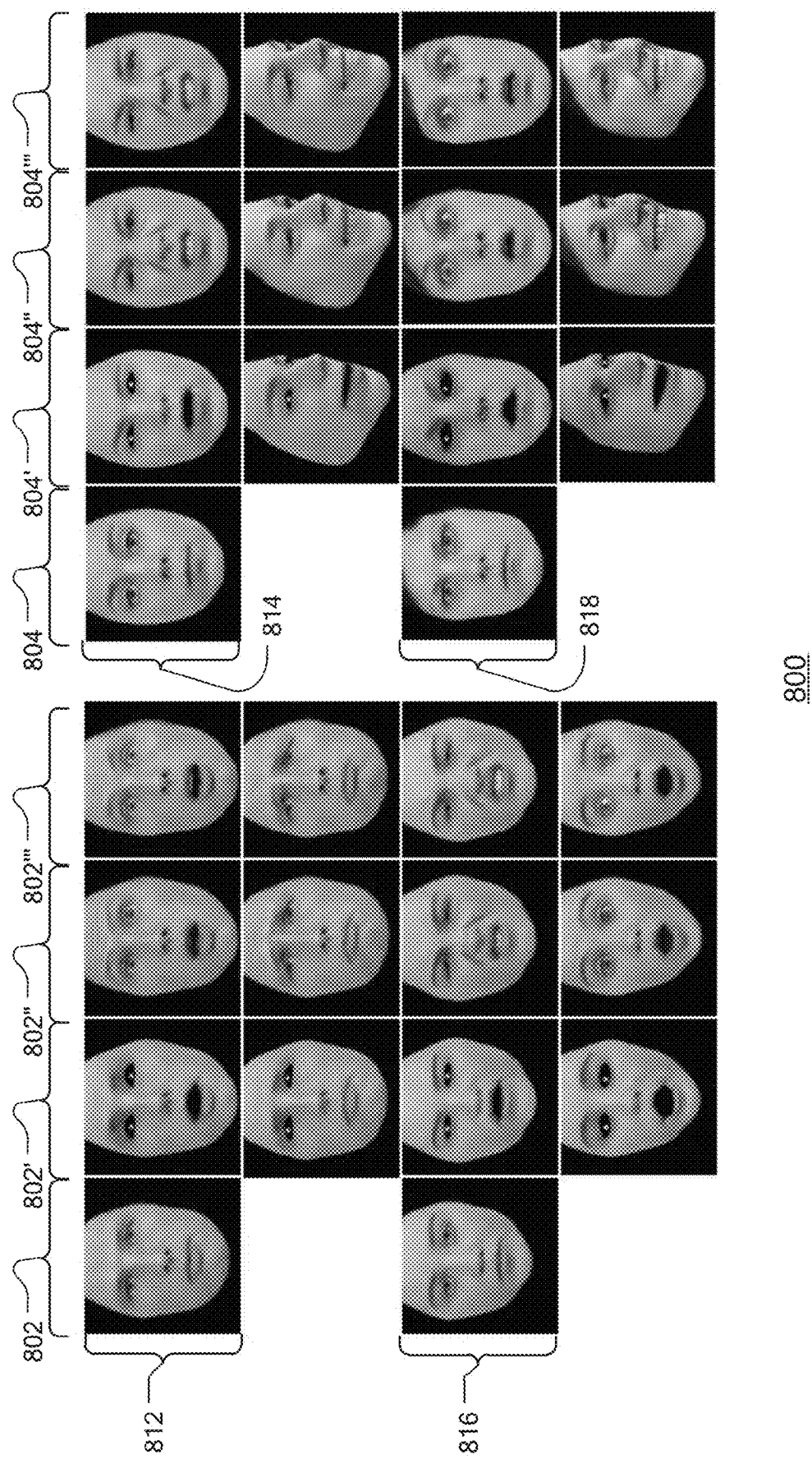
FIG. 8 is set of examples of results for a desired facial expression generated from a single image compared to an actual image of the same expression for the same model.

FIG. 8 is a set 800 of examples of results for a desired facial expression generated from a single image compared to an actual image of the same expression for the same model. In columns 802 and 804, the input neutral image is seen for different faces 812, 814, 816 and 818. In columns 802' and 804' an example deformed neutral and gaze image are shown for two different poses per faces 812, 814, 816, and 818. In columns 802''' and 804''', a generated synthesized expression is shown for two different poses per faces 812, 814, 816, and 818. Finally, for comparison, an actual image of the individual making the desired expression is included in columns 802'''' and 804''''.

Figure 9:
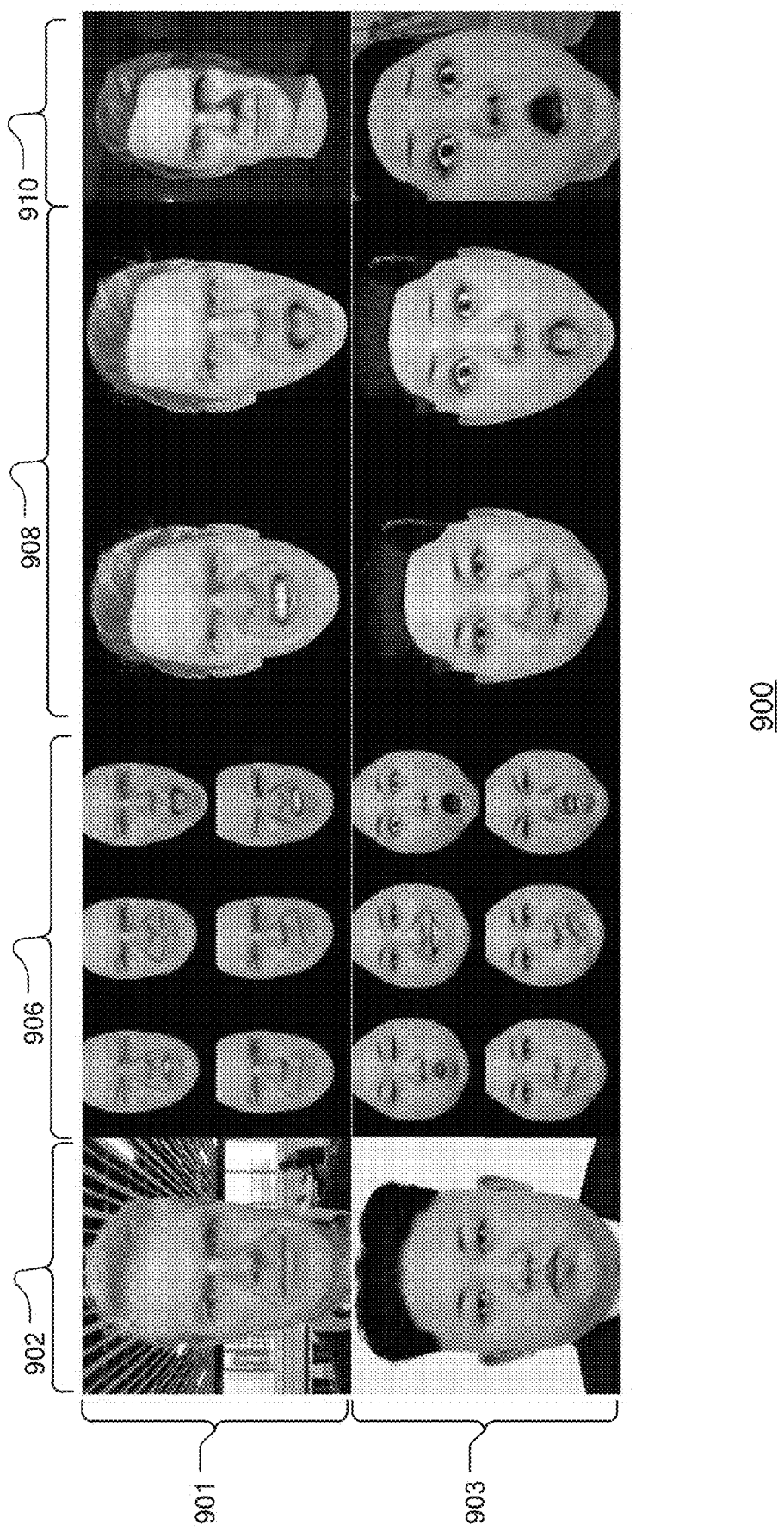
FIG. 9 is a set of example key expressions, associated three-dimensional avatars, and real-time correspondence on a computing device.

FIG. 9 is a set 900 of example neutral image input 902 and resulting key expressions 906, associated three-dimensional avatars 908, and real-time avatar 910 correspondence on a computing device. Two individual neutral input images are shown in 901 and 903. Column 906 shows a series of key expressions for each neutral image input. Column 908 shows two example FACS expressions and the associated images based upon the neutral image that are generated using the method disclosed herein. Finally, column 910 shows an example of the generation of a real-time avatar on a mobile device.

Figure 10:
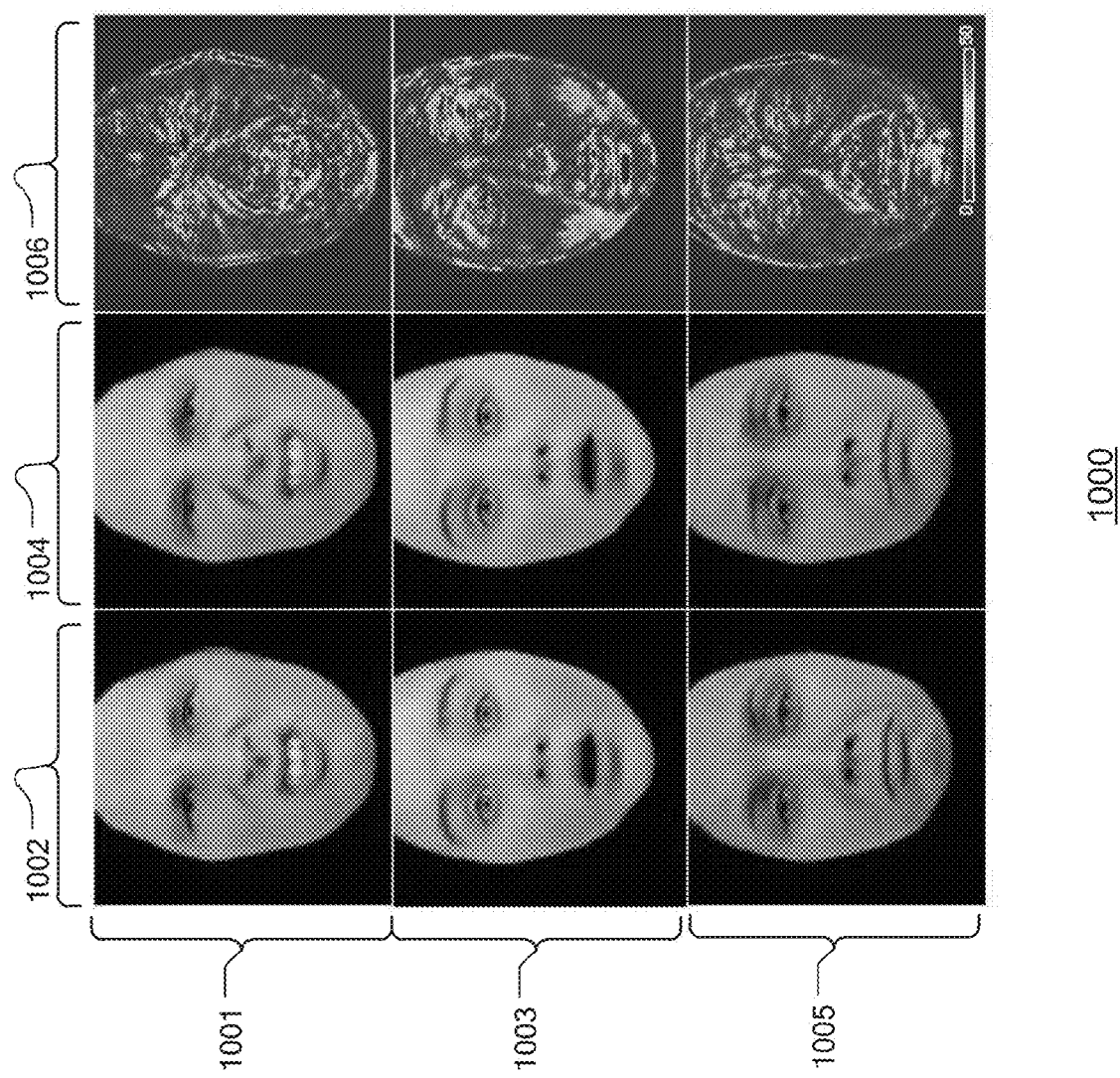
FIG. 10 is a comparison of an actual image of an expression for an individual face in an expression and a synthesized image of the same face in an expression showing the absolute pixel difference between the two.

FIG. 10 is a comparison 1000 of an actual image of an expression for an individual face in an expression and a synthesized image of the same face in an expression showing the absolute pixel difference between the two. Actual images of the individual making a desired expression is shown for faces 1001, 1003, and 1005 in column 1002. The generated synthesized face making the desired expression is shown in column 1004. Finally, a pixel-by-pixel comparison showing photometric error is shown in column 1006. As can be seen, the differences are very slight.

Figure 11:
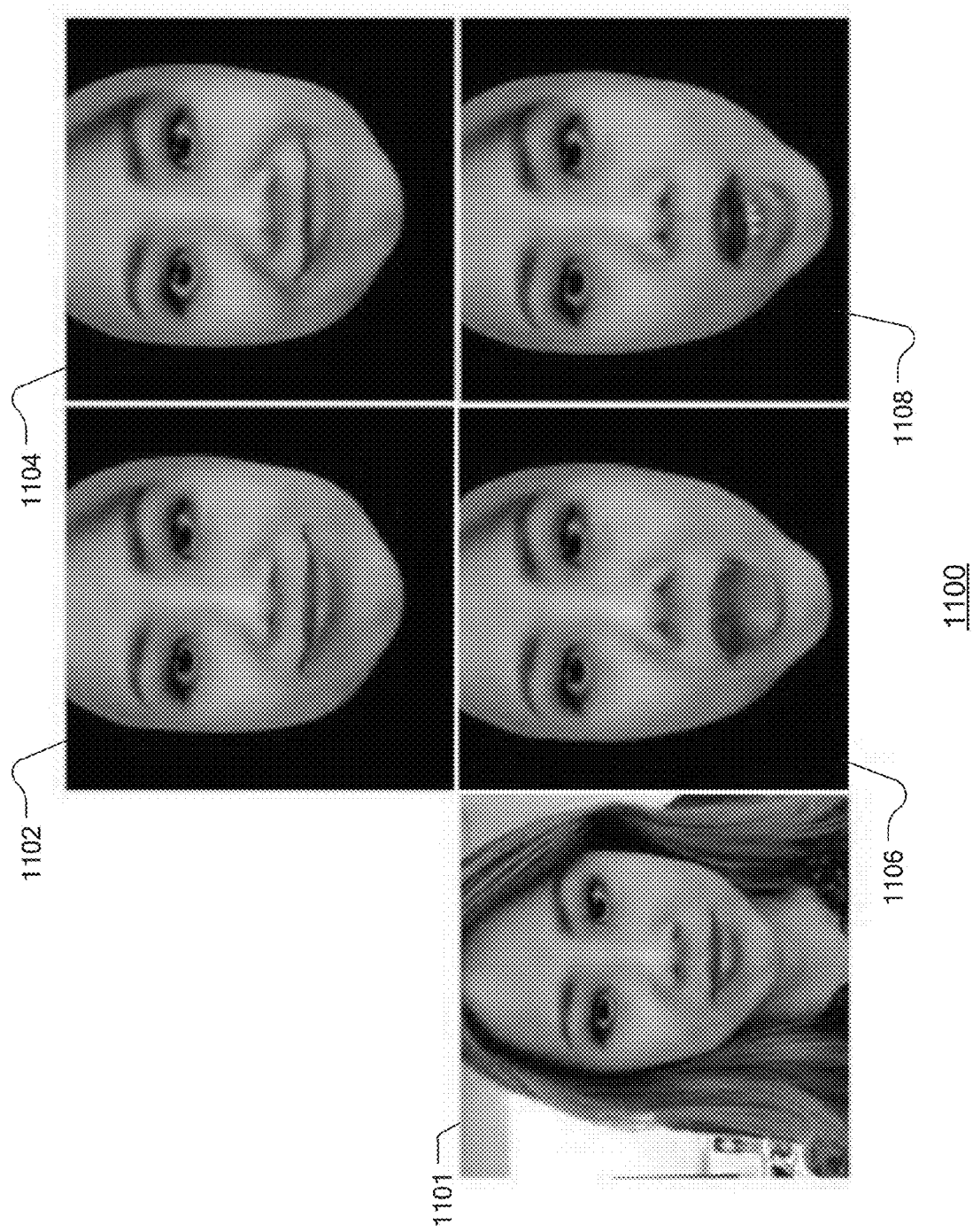
FIG. 11 is a comparison of avatars generated using prior art methods and the methods described herein.

FIG. 11 is a comparison 1100 of avatars generated using prior art methods and the methods described herein. The input neutral image 1101 for an individual face is shown. Image 1102 is an example of a "toothless smile" expression for a prior art method of generating three-dimensional avatars and associated textures. The corresponding "toothless smile" expression for the methods disclosed herein is shown in image 1104. As can be seen, the images are relatively similar. However, there does appear to be a bit more depth of character in image 1104.

In contrast, the open mouth (e.g. talking) image 1108 of the present method shows a more realistic mouth rendering. The undesirable tearing of the mouth into a large set of lips is shown in image 1106. This image demonstrates, among other things, that use of the pre-rendered mouth geometry is a better approach to avoid such issues.

Figure 12:
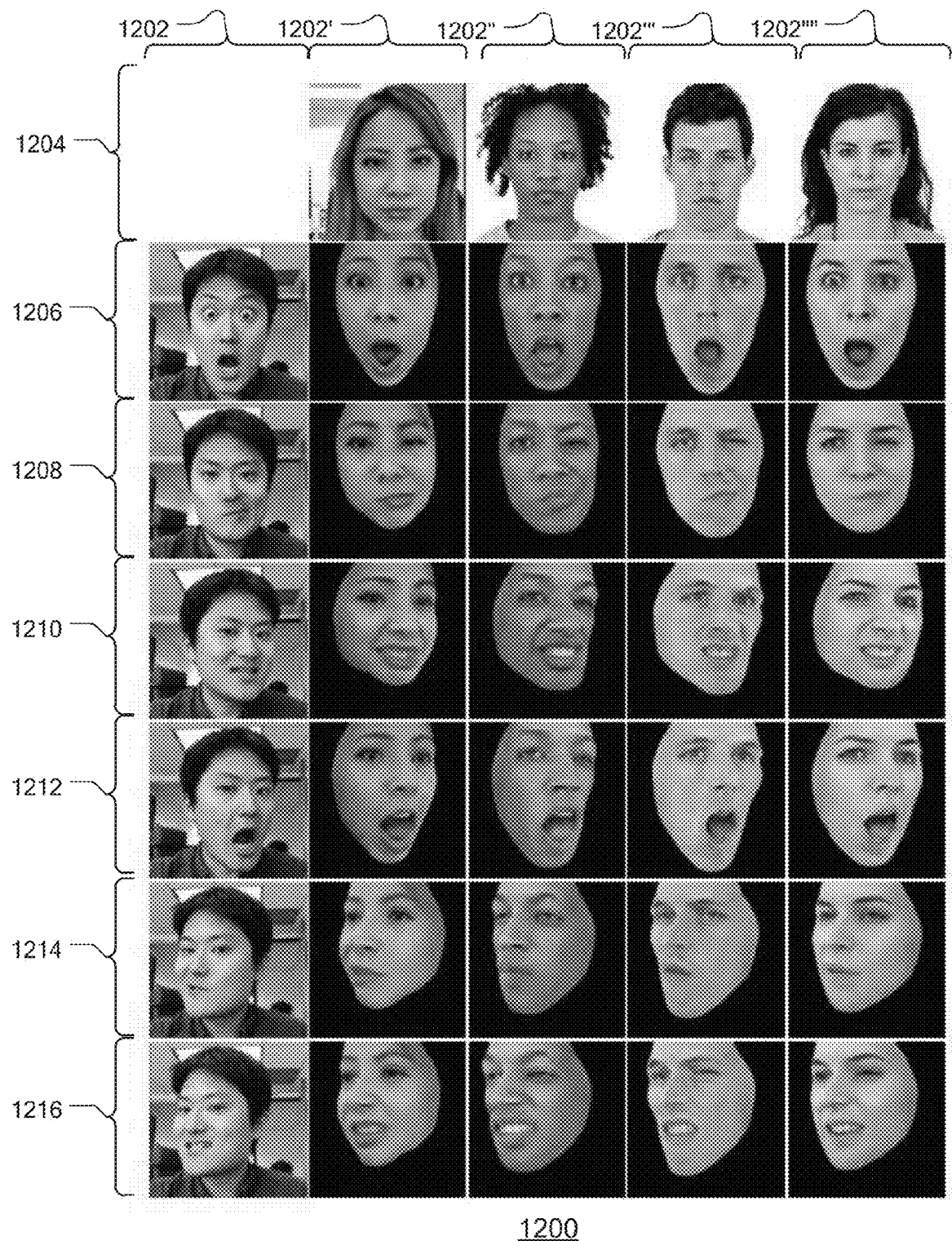
FIG. 12 is a series of examples of particular expressions for one individual with each expression mapped to another model created based upon a single neutral image for that model.

FIG. 12 is a series 1200 of examples of particular expressions for one individual with each expression mapped to another model created based upon a single neutral image for that model. Column 1202 is a series of images of an individual that form the basis of an expression for recreation using the present system. Row 1204 shows a series of neutral images for four individuals that are used as the basis for the present system to create the desired expressions in column 1202. Each of column 1202', 1202", 1202''', and 1202"" shows a series of faces matching each expression 1206, 1208, 1210, 1212, 1214, and 1216. As can be seen, generally, the resulting animations match quite well with the intended expression. Also, the faces appear to have convincing depth and associated texture.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system for generating real-time facial avatars, the system comprising a processor and memory, the processor executing instructions which cause the processor to:
    train a generative adversarial neural network for application in creating a set of predetermined key expressions for an input image by causing the processor to:
    employ a generative network within the generative adversarial neural network to iteratively create facial textures;
    employ a discriminator network within the generative adversarial neural network to iteratively approve or refuse the facial textures as adequately corresponding to a training data set or not adequately corresponding to the training data set; and
    apply the generative adversarial neural network to create the set of predetermined key expressions after training is complete; and
generate a facial avatar by causing the processor to:
    receive a single image of a human face in a neutral facial pose;
    generate a morphable three-dimensional model of the human face and a texture map based upon the single image;
    generate a set of created images for the human face from the texture map, each of the created images representing a predetermined facial expression;
    generate blendshape coefficients and texture maps for each of the set of created images to thereby create the set of predetermined key expressions; and
    generate a series of facial action coding system (FACS) texture maps corresponding to a predetermined set of FACS expressions and an activation mask comprising a per-vertex deformation relative to the neutral facial pose for each desired FACS based upon the predetermined key expressions.

2. The system of claim 1, wherein the predetermined set of FACS expressions are transmitted to a mobile device including a second processor and a second memory, the second processor executing instructions which cause the second processor to:
    store the predetermined set of FACS expressions;
    receive data representing a facial pose to synthesize for the human face;
    generate a synthesized three-dimensional model of the facial pose and applying a facial texture linearly combined between the nearest two of the predetermined set of FACS expressions to the three-dimensional model; and
    output the combined synthesized three-dimensional model with the facial texture.

3. The system of claim 2:
the processor executing instructions which cause the processor to
    pre-calculate a set of eye textures for use in conjunction with the facial texture and the three-dimensional model, each of the set of eye textures corresponding to a particular orientation of an iris, and
    transmit the set of eye textures and the three-dimensional model to the mobile device; and
the second processor executing instructions which cause the second processor to
    linearly combine at least two of the set of eye textures that best correspond to the facial pose to thereby create composite eye textures, and
    apply the composite eye textures to the three-dimensional model.

4. The system of claim 2:
the processor executing instructions which cause the processor to
    pre-generate a set of mouth textures in multiple geometric configurations for the human face, and
    transmit the set of mouth textures and the three-dimensional model to the mobile device; and
the second processor executing instructions which cause the second processor to
    select a subset of the set of mouth textures that is closest to a mouth visible in the facial pose,
    perform per-pixel weighting of the subset of the set of mouth textures to generate a synthesized mouth texture,
    apply a sharpening filter to the synthesized mouth texture to generate a sharpened synthesized mouth texture, and
    apply the sharpened synthesized mouth texture to the three-dimensional model.

5. The system of claim 2 wherein receipt of the facial pose includes completing a translation of a received two-dimensional image into a set of blendshape coefficients.

6. The system of claim 2 wherein the second processor operates to repeat the instructions for multiple frames of captured video, with each frame representing the facial pose.

7. A method of generating real-time facial avatars comprising:
    employing a generative network within the generative adversarial neural network to iteratively create facial textures;
    employing a discriminator network within the generative adversarial neural network to iteratively approve or refuse the facial textures as adequately corresponding to a training data set or not adequately corresponding to the training data set;

applying the generative adversarial neural network to create a set of predetermined key expressions after training is complete;

receiving a single image of a human face in a neutral facial pose;

generating a morphable three-dimensional model of the human face and a texture map based upon the single image;

generating a set of created images for the human face from the texture map, each of the created images representing a predetermined facial expression;

generating blendshape coefficients and texture maps for each of the set of created images to thereby create the set of predetermined key expressions; and generating a series of facial action coding system (FACS) texture maps corresponding to a predetermined set of FACS expressions and an activation mask comprising a per-vertex deformation relative to the neutral facial pose for each desired FACS based upon the predetermined key expressions.

8. The method of claim 7 further comprising:
storing the predetermined set of FACS expressions;
receiving data representing a facial pose to synthesize for the human face;
generating a synthesized three-dimensional model of the facial pose and applying a facial texture linearly combined between the nearest two of the predetermined set of FACS expressions to the three-dimensional model; and
outputting the combined synthesized three-dimensional model with the facial texture.

9. The method of claim 8 further comprising:
pre-calculating a set of eye textures for use in conjunction with the facial texture and the three-dimensional model, each of the set of eye textures corresponding to a particular orientation of an iris;
transmitting the set of eye textures and the three-dimensional model to a mobile device;
linearly combining at least two of the set of eye textures that best correspond to the facial pose to thereby create composite eye textures; and
applying the composite eye textures to the three-dimensional model.

10. The method of claim 8 further comprising:
pre-generating a set of mouth textures in multiple geometric configurations for the human face;
transmitting the set of mouth textures and the three-dimensional model to a mobile device;
selecting a subset of the set of mouth textures that is closest to a mouth visible in the facial pose;
performing per-pixel weighting of the subset of the set of mouth textures to generate a synthesized mouth texture;
applying a sharpening filter to the synthesized mouth texture to generate a sharpened synthesized mouth texture; and
applying the sharpened synthesized mouth texture to the three-dimensional model.

11. The method of claim 8 wherein receipt of the facial pose includes completing a translation of a received two-dimensional image into a set of blendshape coefficients.

12. The method of claim 8 further comprising repeating the steps of claim 8 for multiple frames of captured video, with each frame representing the facial pose.

13. An apparatus comprising a storage medium storing a program having instructions which when executed by a processor will cause the processor to:
train a generative adversarial neural network for application in creating a set of predetermined key expressions for an input image by causing the processor to:
employ a generative network within the generative adversarial neural network to iteratively create facial textures;
employ a discriminator network within the generative adversarial neural network to iteratively approve or refuse the facial textures as adequately corresponding to a training data set or not adequately corresponding to the training data set; and
apply the generative adversarial neural network to create the set of predetermined key expressions after training is complete; and
generate a facial avatar by causing the processor to:
receive a single image of a human face in a neutral facial pose;
generate a morphable three-dimensional model of the human face and a texture map based upon the single image;
generate a set of created images for the human face from the texture map, each of the created images representing a predetermined facial expression;
generate blendshape coefficients and texture maps for each of the set of created images to thereby create the set of predetermined key expressions; and
generate a series of facial action coding system (FACS) texture maps corresponding to a predetermined set of FACS expressions and an activation mask comprising a per-vertex deformation relative to the neutral facial pose for each desired FACS based upon the predetermined key expressions.

14. The apparatus of claim 13, wherein the instructions further cause the processor to:
store the predetermined set of FACS expressions;
receive data representing a facial pose to synthesize for the human face;
generate a synthesized three-dimensional model of the facial pose and applying a facial texture linearly combined between the nearest two of the predetermined set of FACS expressions to the three-dimensional model; and
output the combined synthesized three-dimensional model with the facial texture.

15. The apparatus of claim 14 wherein the instructions further cause the processor to:
pre-calculate a set of eye textures for use in conjunction with the facial texture and the three-dimensional model, each of the set of eye textures corresponding to a particular orientation of an iris;
transmit the set of eye textures and the three-dimensional model to a mobile device; and
linearly combine at least two of the set of eye textures that best correspond to the facial pose to thereby create composite eye textures; and
apply the composite eye textures to the three-dimensional model.

16. The apparatus of claim 14 wherein the instructions further cause the processor to:
pre-generate a set of mouth textures in multiple geometric configurations for the human face;
transmit the set of mouth textures and the three-dimensional model to a mobile device;

select a subset of the set of mouth textures that is closest to a mouth visible in the facial pose;

perform per-pixel weighting of the subset of the set of mouth textures to generate a synthesized mouth texture;

apply a sharpening filter to the synthesized mouth texture to generate a sharpened synthesized mouth texture; and apply the sharpened synthesized mouth texture to the three-dimensional model.

17. The apparatus of claim 13 further comprising:

the processor;

a memory; and wherein the processor and the memory comprise circuits and software for performing the instructions on the storage medium.

\* \* \* \* \*